May 3, 1932.   J. McMULLEN   1,856,106
SHIPPING AUTOMOBILES
Filed Nov. 8, 1929   3 Sheets-Sheet 1
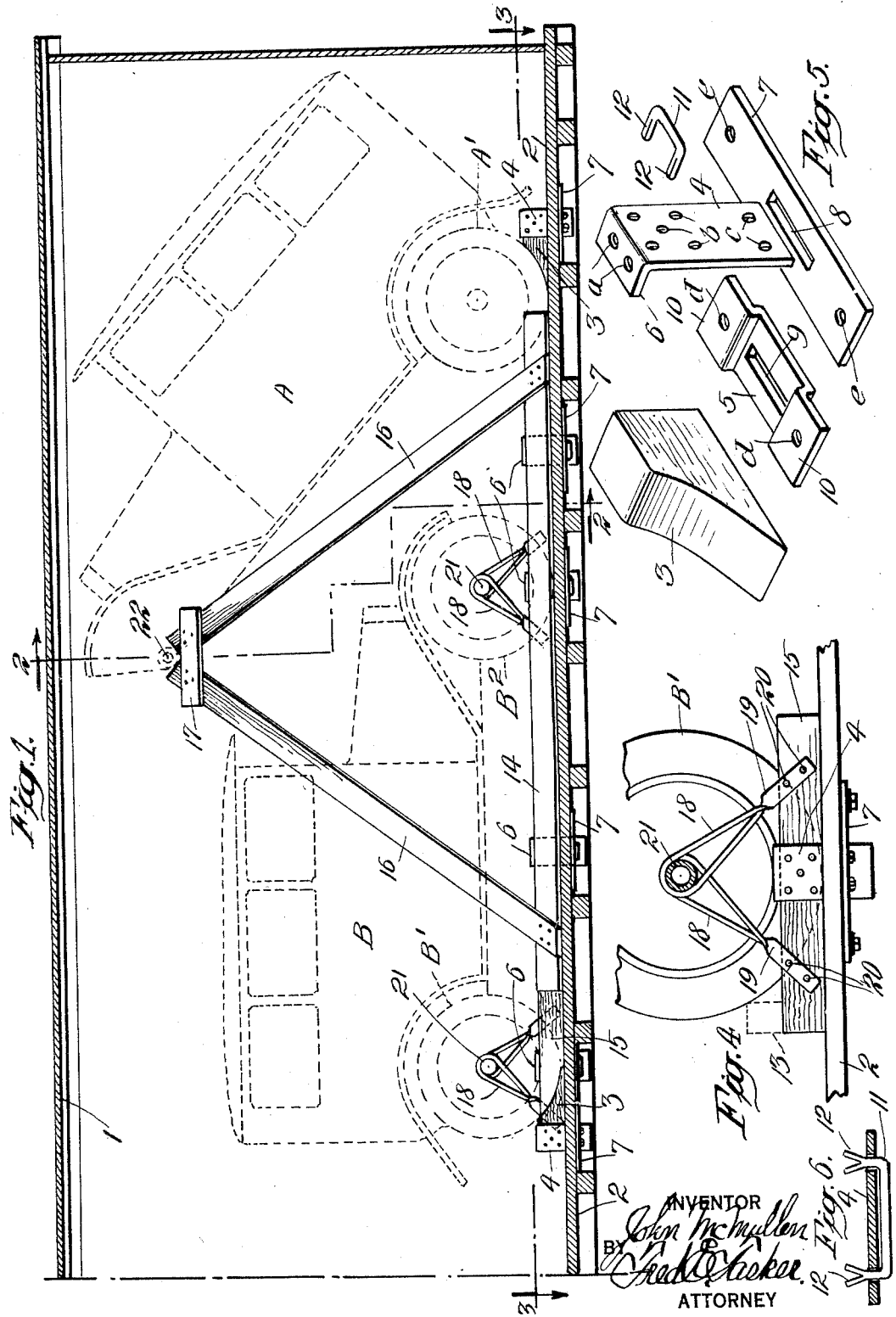

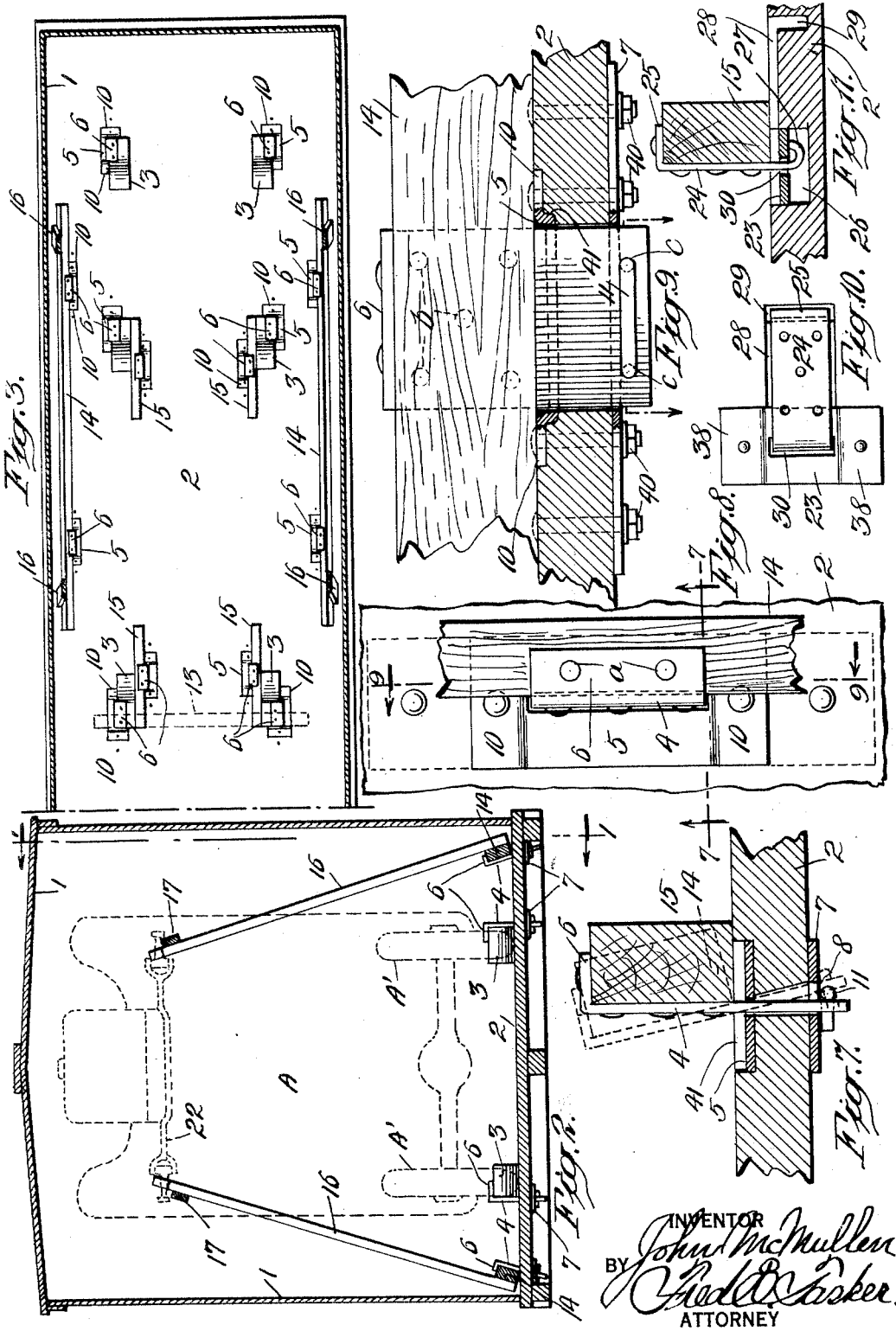

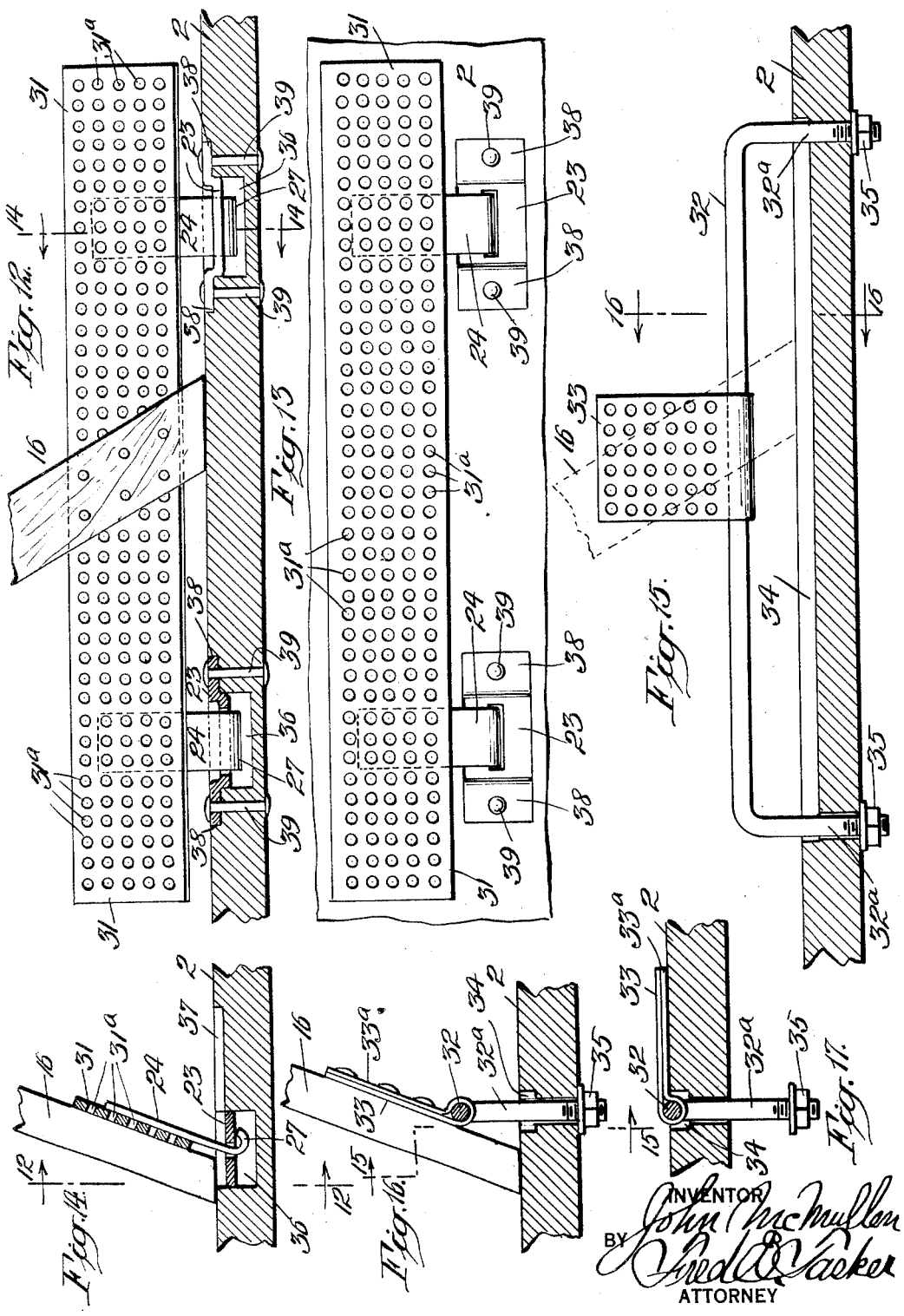

Patented May 3, 1932

1,856,106

UNITED STATES PATENT OFFICE

JOHN McMULLEN, OF BUFFALO, NEW YORK

SHIPPING AUTOMOBILES

Application filed November 8, 1929. Serial No. 405,654.

The present invention refers to the carrying of automobiles in freight cars of various kinds, either flat cars, gondola cars, or box cars, but preferably and usually the latter. A leading object is to prevent damage to the car construction by the use of the means for securely fastening the automobiles in the car and allowing them to be removed quickly and easily at the end of the journey.

In one well known method of loading, owing to the length of the completely assembled automobiles, as they are generally shipped, the cars are capable of carrying only four motor cars arranged in a single row, two being placed, one in each end of the car with the rear end of the automobile adjacent to the end of the car, and said two being mounted in inclined or half decked positions with their ends at opposite ends of the car, while the other two of the four are placed end to end on all their four wheels and with their hoods extending under the half decked automobiles. There are many ways of loading; I only mention this one.

Heretofore in the shipment of automobiles in railway box cars it has been customary to employ mechanisms, often elaborate and costly, for supporting the automobiles during shipment in such a manner that they are firmly held and prevented from movement either longitudinally or laterally with respect to the car; but such mechanisms usually involve the bolting, spiking or nailing of various holding or clamping devices to the floor or sides of the car; all of which nailed parts have to be dislodged when the automobile is to be released and removed from the car for delivery, usually tearing the floor and resulting in excessive damage to the car, and causing great expense in the way of repairs. And successive shipments with repeated nailing in the same spot increases the damage.

My chief aim is to avoid injury to the cars and their floors which support and carry automobiles, and this I accomplish in the present instance by permanently providing novel clamping appliances in the floor of the car, which appliances cooperate with temporary braces, rails, chocks, strap devices and other dunnage, used to sustain the loaded automobiles in position, which appliances remain more or less concealed in the car floor flush therewith when not in use, but are capable of being readily lifted into an active position for use, the paramount object being to save the car construction from injury and avoid repair costs.

With these suggested objects in view and many others that might be enumerated, my invention may be said to consist in the novel combination, construction, and arrangement of parts, hereinafter described, illustrated in the accompanying drawings and pointed out in the claims hereto appended; it being understood that various changes in the form, proportion, size and minor details of construction within the scope of the claims, may be resorted to without departing from the spirit or sacrificing the advantages of the invention.

To more fully disclose my improvements, reference is made to the annexed drawings, in which:

Figure 1 is a longitudinal section on the line 1, 1, of Figure 2 of my improved means for shipping automobiles.

Figure 2 is a transverse section on the line 2, 2, of Figure 1.

Figure 3 is a top plan view of the car floor equipped with my improved clamping devices.

Figure 4 is a detailed view showing the arrangement of the hold-down straps for the left axle carrying said wheel and my improved clamping means for holding said straps near the floor.

Figure 5 is a perspective view of a group of detached members.

Figure 6 is a section of the perforated lower end of the clamping device, and shows the locking pin or device locked therein.

Figure 7 is a vertical sectional detail of the clamp holding plates and a fragment of the car floor to which they are fastened, said section being on line 7, 7, of Figure 8.

Figure 8 is a detail plan view of a fragment of the car floor and part of the clamping devices.

Figure 9 is a vertical section on the line 9, 9, of Figure 8.

Figure 10 is a plan view of a modified form of clamping devices and its top plate on the floor.

Figure 11 is a sectional view of the same.

Figure 12 is a section on the line 12, 12, of Figure 14 of an alternative form of clamping mechanism, having clamps similar to those shown in Figures 10 and 11, but indicating a metallic plate connection whereby several clamps are permanently conjoined into a single unit; the same being in its raised and active position.

Figure 13 is a plan view of the same showing a pair of clamps and the plate connecting them closed down on the floor in their inactive position.

Figure 14 is a vertical sectional view on the line 14, 14, of Figure 12.

Figure 15 is a sectional view on the line 15—15, of Figure 16 of a still further modified form of clamping device and a floor rail with posts for carrying and loosely hinging it, the same clamp being shown in its raised and active position.

Figure 16 is a section of the same on the line 16, 16, of Figure 15.

Figure 17 is a similar view of this modified form of clamp when closed down on the floor out of use.

Like characters of reference denote like parts throughout all the different figures of the drawings.

In the one form of loading which I have illustrated for explanatory purposes only and with no intention of being confined thereto, two automobiles shown in outline in dotted lines at A and B are placed in the one half 1 of the car, the other half which is not shown being similarly filled with two more automobiles. The automobile A is in the end of the car with its rear end adjacent to the end of the car. Each rear wheel A¹ is held by a chock block 3. The automobile A is mounted in an inclined or half deck position and held there by means of a frame that I will shortly explain.

The automobile B is placed with its wheels B¹ and B² on the floor and with its hood under the half decked automobile A and its wheels held by chock blocks, and the car anchored by hold-down straps or similar means. The lading of the automobiles may be arranged relatively to each other in various ways, and the selection of a loading method may depend somewhat on the size and type of the automobile.

When the front of an automobile, as A, is raised to occupy a half decked position, it is essential to have a strong frame or horse to hold it up. One kind that can be used comprises two doubly-inclined supports 16, 16, located in pairs on each side of the car, the same being inclined toward each other in an inverted V-shape, the upper ends being joined by a short horizontal tie 17 and providing at their top meeting point an angle that receives and holds the axle spindle at one end of the front axle 22. These supports 16 are also splayed outwardly from their top ends to the sides of the car 1 at the bottom.

With such an arrangement the lower ends of the supports or legs 16 of these supporting frames are quite closely adjacent to the side walls of the car. At this point the lower ends of these members 16 are nailed or otherwise securely fastened to the longitudinal beams, planks or strips 14 on the floor of the car, see Figures 1 and 2.

Chock blocks 3 are used with the rear wheels A¹ of the inclined car A, and with the wheels B¹ and B² of the horizontal car B. All these chocks 3 are of the common and well known form with an arcuate section that corresponds to and receives against it a segment of the wheel tire. The chocks are all secured to the car floor as I shall presently specify.

Also the car B besides having its wheels chocked, has the axles 21 or some other adjacent parts held in place by hold-down straps 18, 18, two at each end which are lopped thereover with their lower ends 19 secured by nails or bolts 20 to short rails or bars 15 that lie on the car floor 2 contiguous to the chocks 3, see Figure 3; and these bars or members 15 are secured to the car floor by my improved means.

At various points in the floor 2 I provide shallow recesses 41 in the upper surface thereof as shown in Figures 7 and 9, the said recesses having relatively deep portions intermediate their ends. Each of these recesses is shaped and configured to accommodate therein a plate 5, having flat raised ends 10, which ends lie flush with floor 2 and have perforations $d, d$, through which pass bolts 40 which also pass through floor 2 and securely hold the plate 5 in position in recess 41. Each plate 5 also has a slot 9 extending between its flanges 10. Further on the underside of floor 2 opposite each plate 5 is a longer plate 7 having end perforations $e, e$, through which pass the same retaining bolts 40, said plates 7 having slots 8 directly opposite slots 9 in the top plates 5 and in communication therewith through vertical passages in the floor 2, see Figures 5, 7, 8, and 9.

Clamping plates 4, each having a top right-angled flange 6 perforated at $a, a$ and a body portion perforated at $b, b$ for the passage of fastening means, pass through the respective slots in the plates 5 and 7 by which they are held in an upright position, extending above the car floor and can engage parts of the automobile supporting and bracing frames.

The plates 4 are provided near their lower ends which are below the lower plates 7 with perforations $c, c$, that receive the ends of a rectangular holding pin or cotter pin 11, see Figures 5 and 6, whose ends 12 after the pin is inserted in holes c can be spread open where they are cleft so as to keep the pin from leaving plate 4 and thus hold the plate 4 fixedly in position in the floor of the car, but permit a removal of the plate if desired.

The slots 8 in plates 7 are some of them wider than the slots 9 in the upper plates 5, especially for those clamps 4 that are used with rails 14, since rails 14 when in position are inclined to the vertical, and it is consequently necessary for the clamps to be similarly inclined, as shown in dotted lines in Figure 7, or in full lines in Figure 2. The wider slot 8 enables the plate 4 therein to swing out of the vertical so that its top flange 6 may embrace the top inclined edge of rail 14. With the rails 15, however, which are not inclined, the clamps 4 occupy vertical positions, as in full lines in Figure 7, and in this case it is sufficient if the slots 8 and 9 are of the same width. When in position, either vertical or inclined, and in engagement with members of the automobile holding frames, or before being so placed the retaining pins 11 can be put in place to hold these clamps from being dislocated when in use. Obviously spikes or nails can be driven through the perforations a, a, so as to bind the flange 6 to the rails or beams 14 or 15 or chocks 3, and likewise nails or spikes or the like will be driven through the perforations b in plate 4 into the sides of similar members, so that these clamps will be securely attached to these parts. Then when a box car is emptied, the clamping devices may be disconnected from the temporary parts, and the plates 4 allowed to drop down through the slots 8 and 9, so that the plates will hang out of use in an idle position with the top lip or flange 6 supported on plate 5 below its raised ends 10 and flush with the horizontal surface of the car floor; and ready for use again at any time by simply lifting it into operative position where it may be clamped and secured again to parts of the automobile supporting frames as before. The positions of all these various parts at different times will be evident from the drawings.

A modified form of this vertical clamp is shown in Figures 10 and 11. Here 24 denotes the clamping plate, having a lip or flange 25 on one end which is adapted to take over the edge of beam 14 or 15 or chock 3 and be spiked thereto, see Figure 11, the plate 24 being also secured to the side of said member as indicated. The other or lower end of plate 24 is bent over to form a hook 27 that passes through a slot 30 in plate 23 and engages the under face of the plate 23, there being a cavity 26 in the floor under plate 23, large enough to allow this movement. The plate 23 is the equivalent of plate 5; and any lower plate, as 7, is dispensed with in this case as being unnecessary. Plate 23 has raised ends 38, 38, that are bolted or secured in the depression in the flooring, just as ends 10 of plate 5 are secured. The plate 24 when disconnected from the beam 15 or other frame member, lies down flush with the floor in recess 28, and its flanged end 25 occupies the deeper recess part 29. Thus the hooked plate 24, hinged to the fixed plate 23 as it where by the hooking means 27 provides an easy substitute for the vertically-movable plate 4, and for many purposes in many locations is cheaper and simpler and just as effective.

A convenient adaptation, for the saving of parts and decreasing of expense, is found in the use of the cross-bar 13, shown in plan in Figure 3 and in end view in Figure 4. By using this bar 13 to block the wheels $B^1$ of one of the motor cars I dispense with two chocks and two clamps for fastening said chocks to the floor; but I hold the automobile in position just as securely as when the chocks are employed, for the bar presses tightly against the tires of two wheels $B^1$. This bar 13 is nailed or spiked securely to the two beams 15, which carry the hold-down straps 18 of these wheels $B^1$.

In Figures 12, 13 and 14 are shown other modifications of my invention.

The horses or frames for holding the front end of one of the automobiles in an elevated position as shown in Figure 1 have as we have seen the doubly-inclined legs or braces 16 that are connected together by long horizontal beams or rails 14, and they are grasped by the clamping devices to hold them and consequently their horses or frames in an immovable position. In many forms of the invention, therefore, these rails 14 form a part of the dunnage and are broken up and discarded when the packed automobiles are detrained, no attempt being made to reuse these packing frames or the rails included among them as a part thereof. As the rails are so essential for sustaining the legs 16 I have substituted for the temporary wooden supports, metallic bars or plates, as 31, which are not a part of the dunnage and are not thrown away after every use, but are connected to one or more clamps to form a permanent unit, and the legs 16 are spiked or bolted to this permanent unit instead of to a temporary wooden rail, as 14. These plates 31 are foraminous or multiperforated, being provided with a large number of perforations 31a for rivets or bolts. They are usually shorter than the long wooden beams 14, for there will be one plate 31 for each leg 16, and each plate 31 will have two clamping devices, between which the lower end of leg 16 will be bolted. The long wooden rails on the other hand have two legs 16 connected to them, and each rail 14 needs only two clamps, one near each end.

In showing the use of a steel or metallic horizontal member secured to a pair of clamps to form a single permanent unit to support a frame, I have for illustration only selected the modified clamp 24 having the hooked end 27 as shown in Figures 8 and 11, to combine with the perforated plate 31, as shown in Figures 12, 13, and 14, except that I make the hooked members 24 without a top flange 6, because there is no need of such a flange since the plate 24 is riveted to the plate 31, to which in turn the leg 16 or its equivalent is bolted or secured.

When the members 24 are lifted into an operative position they will be vertical or inclined as the case may be and will hold the union or connecting foraminous plate 31 in the same upright position, as shown in Figure 14, so that a leg 16 or other part of the automobile carrying frame may be secured thereto by bolts or the like passing through a few of the holes 31a. The object of having a very numerous and liberal supply of holes 31a is so that the leg 16 may be easily attached thereto at any point or angle, thus making the attachment of the parts easy and the adjustment and connection thereof rapid and effective. After the use of this mechanism, and the disconnection of the plates 31 from the dunnage, the plates 31 will lie flat on the floor or slightly above the floor, as the projection of these plates slightly above the floor surface will not be objectionable in any way, while obviously the plates 24 will then fit back into the depressed parts of plates 23. This portion of the parts is shown in Figure 13.

Still another alternative form of the invention which will be found very serviceable for many uses is portrayed in detail in Figures 15, 16, and 17. In this modification I use a rail or rod 32 bent at each end to provide a right angled post 32a which passes through an opening in floor 2, the ends of posts 32a being screwthreaded and supplied with nuts 35, which are under floor 2, as indicated in Figure 15. The rail is capable of being raised into its operative position, which is horizontal as shown in Figure 15 where the posts 32a are lifted up through the passage containing them but are prevented from going up too far by the nuts 35 or washers therewith striking against the under side of floor 2. The raised position is also indicated in Figure 16. When the device is not in use the rail 32 is dropped into a groove 34 in the floor, and the posts 32a drop down through their guiding passages, as seen in Figure 17. Carried on the rail 32 are one or more movable clamping plates 33. They are foraminous and made in parallel sections riveted together, as 33 and 33a, there being a loop at one end bent around the rail 32, so that the plate may slide easily on rail 32 and also be hinged thereon by this loop, so that the plate is adjustable in many directions. This plate is riveted or bolted to leg 16 or any other part of the dunnage material, or two of the plates may be united by another plate which will be bolted to the frame material. When the plate 33 is folded down it will lie on floor 2 as in Figure 17.

I have thus shown and described several forms that the invention may easily assume to adapt it for use in various locations so as to solve different problems, but these few forms do not exhaust the field of change, and I reserve the liberty of making such other changes as I desire within the scope of the claims.

It will be noted that by the use of my permanent clamps that engage temporary and transient holding members I not only preserve the car structure from injury and demolition through rough handling, but I also provide a much more effective anchoring of the frames and blocks to the car floor. When chocks, as 3, and straps, as 18, and frames with legs, as 16, have their lower ends spiked or nailed to the floor, a strong upward pull on these parts, or an excessive and extreme vibration of the car, may pull the nails from the floor, and cause the destruction or great damage to the dislodged automobiles. When however, clamps or straps which stand alongside of the chocks and frames vertically or substantially so and are spiked thereto by spikes that enter the wooden members, the spikes are in sheer and cannot be pulled out or loosened by any strain thereon, since such strains as exist are not in the right direction to affect them, and hence the result with these clamps is far more satisfactory.

What I claim, is:

1. The hereindescribed means for shipping automobiles without injury to the shipping car, which consists in the combination with a car floor, of a plurality of slotted plates set therein flush with the surface of the floor, and a movable member passing loosely through each of said plates and adapted to be lifted from a concealed flush position in the plate to an upright active position, and supports for the automobiles to which the aforesaid movable members when upright are spiked to hold the automobiles from lateral and endwise jarring out of place, each movable member being flanged at the top and perforated on top and side for spikes or nails.

2. The hereindescribed means for shipping automobiles without injury to the car containing them, which consists in the combination with a car floor, of a plurality of plates set therein provided with slots, a movable clamp member in each slot and adapted to occupy an upright active position at times, means for keeping the member in the slot, and supporting means for the automobiles, to which the aforesaid upright movable members are secured to hold the automobiles in fixed positions, together with means for securing said movable members to temporary parts of the frames and other elements that support the automobiles in position in the car.

3. The hereindescribed means for shipping automobiles without injury to the car in which they are shipped, which consist in the combination with a car floor, of a plurality of slotted plates set in the top of the floor at a plurality of points, a set of slotted plates below them on the bottom of the floor, a member in each pair of slotted plates and having a flanged upper end, said members being adapted to be lifted vertically from a concealed flush position in the floor to an upright service position, and beams, and braces for the automobiles, which are engaged by the lifted members, and to which said members are spiked to hold the supported automobiles from lateral or endwise displacement.

4. The hereindescribed means for supporting automobiles in cars without injury to floors of said cars, which consists in the combination with the car floor, of slotted plates set fast thereon, movable clamping members having a hooked end and connected to each of said plates in the slot thereof and adapted to be lifted from a flush position in the plate to an upright active position, chocks for automobile wheels to which said upright members are fastened, and bars forming portions of automobile carrying frames, to which bars upright members are fastened, all to prevent lateral and endwise jar and dislocation of the automobiles while in transit.

5. In a device of the class described, the combination with the floor, of a plate therein, a member movably connected to said plate and adapted to be lifted into an upright position above the floor, a foraminous plate secured to said movable member, and a temporary merchandise support to which the foraminous plate is detachably connected when the device is in service position.

6. In a device of the class described, the combination with the floor, of plates therein, a movable member connected to each plate, and a union member secured to two or more movable members, together with automobile temporary supporting means, to which the union member is rigidly fastened when the movable members are lifted from floor position to service position.

In testimony whereof I hereunto affix my signature.

JOHN McMULLEN.